United States Patent
Hsia et al.

(10) Patent No.: US 10,209,453 B1
(45) Date of Patent: Feb. 19, 2019

(54) PACKAGING OF AN OPTICAL FIBER HEAD WITH OPTICAL FIBER NOT IMMERSED IN COOLING WATER TO ENHANCE RELIABILITY AND OPTICAL PERFORMANCE

(71) Applicant: Lightel Technologies, Inc., Renton, WA (US)

(72) Inventors: Chungho Hsia, Bellevue, WA (US); Pai-Sheng Shen, Bellevue, WA (US)

(73) Assignee: LIGHTEL TECHNOLOGIES, INC., Renton, WA (US)

( * ) Notice: Subject to any disclaimer, the term of this patent is extended or adjusted under 35 U.S.C. 154(b) by 0 days.

(21) Appl. No.: 16/148,595

(22) Filed: Oct. 1, 2018

Related U.S. Application Data

(63) Continuation-in-part of application No. 15/727,569, filed on Oct. 7, 2017, now Pat. No. 10,101,550.

(51) Int. Cl.
*G02B 6/44* (2006.01)
*G02B 6/36* (2006.01)
*G02B 6/24* (2006.01)
*G02B 6/255* (2006.01)

(52) U.S. Cl.
CPC ........... *G02B 6/3624* (2013.01); *G02B 6/241* (2013.01); *G02B 6/255* (2013.01)

(58) Field of Classification Search
CPC .................................... G02B 6/44; F21V 8/00
USPC ......................................... 362/553, 551, 554
See application file for complete search history.

(56) References Cited

U.S. PATENT DOCUMENTS

2013/0011102 A1* 1/2013 Rinzler ................ G02B 6/3813
385/89
2017/0172174 A1* 6/2017 Rizvi ..................... A23L 3/361

* cited by examiner

*Primary Examiner* — Edwyn Labaze
(74) *Attorney, Agent, or Firm* — Han IP PLLC; Andy M. Han

(57) ABSTRACT

A water-cooled package of an optical fiber head comprising a delivery optical fiber (DOF), a front optical end cap (OEC), a rear OEC, a glass ferrule, and a housing operates for delivering the laser light from DOF to free space. The rear OEC is fusion-spiced with a section of DOF with a cladding exposed whereas the section of DOF is enclosed in a bore of the glass ferrule. When the glass ferrule is connected and sealed between the front OEC and the rear OEC, cooling water in the water-cooled package is prevented from immersing the section of DOF to maintain reliability of DOF. It is, therefore, not needed to bond the section of DOF in a bore of the front OEC to be waterproof, minimizing varying stress-induced speckle patterns and ultimately maintaining beam quality of the laser light exiting from DOF to free space.

16 Claims, 6 Drawing Sheets

PACKAGING OF AN OPTICAL FIBER HEAD WITH OPTICAL FIBER NOT IMMERSED IN COOLING WATER TO ENHANCE RELIABILITY AND OPTICAL PERFORMANCE

CROSS-REFERENCE TO RELATED APPLICATIONS

The present disclosure is part of a continuation-in-part (CIP) application of U.S. patent application Ser. No. 15/727,569, filed 7 Oct. 2017. Content of the above-identified application is incorporated herein by reference in its entirety.

TECHNICAL FIELD

The present disclosure relates to packaging of an optical fiber head used in high power laser delivery applications and, more particularly, to various water-cooled schemes in packaging such an optical fiber head with a delivery optical fiber not immersed in cooling water to maintain long-term reliability of the delivery optical fiber and laser beam quality when a high-power laser light is delivered to free space.

BACKGROUND

High-power fiber lasers have received a wide attention in the past ten years. Such lasers with several kilowatts (kWs) or several tens of kWs have been used as commercially available products in industries. In comparison with solid-state lasers, fiber lasers have a unique feature of a superb beam quality at high power due to an all-fiber configuration. That is, all the optical components used in the fiber lasers are of an optical fiber type, connected using fusion splices without air interfaces between any two of the optical components in connection. The optical components include multiple diode laser pumps with multiple optical fiber pigtails, an amplification optical fiber with two fiber Bragg gratings, a transmission fiber spliced to the amplification optical fiber, and an optical fiber combiner with multiple input optical fibers to splice to the multiple optical fiber pigtails of the multiple diode laser pumps and with an output optical fiber to splice to the amplification optical fiber. The amplification optical fiber, doped with a rare earth element such as erbium (Er) or ytterbium (Yb) as a gain medium, provides for a beneficial geometry and a large surface to volume ratio, thus allowing for extraordinary heat dispersion and reducing thermal lensing effect when compared to rod type solid state lasers. The amplification optical fiber with the gain medium receives and absorbs optical energy from the multiple diode laser pumps through the optical fiber combiner and creates a coherent laser light via a resonator built by using the two fiber Bragg gratings at two ends of the amplification optical fiber. Such multimode fiber lasers in the 2- to 6-kW regime are ideal for cutting and welding, and particularly in the area of materials processing and laser machining as a reliable replacement for bulky diode pumped solid-state lasers and $CO_2$ lasers. It has been shown that lengthening the amplification optical fiber can inherently increase power of the fiber lasers without a limit. However, double clad optical fibers (DCOFs) used in both the output optical fiber of the optical fiber combiner and the amplification optical fiber are surrounded by a polymer coating with a limited tolerance to heat. In other words, the maximum thermal load provided by the coating dictates the maximum output power that the fiber laser can attain.

Not similar to optical fibers used in optical communications, where the coatings outside the optical fibers simply play a role of mechanical protection, the polymer coatings used in DCOFs perform both mechanical and optical functions. DCOFs use dual acrylate coatings, with a first low refractive index polymer coating in contact with the glass core, and with a durable second coating to protect the first relatively soft low refractive index coating. In other words, the second coating mechanically protects the low refractive index coating from mechanical chips, cuts, or scratches which may result in optical energy to leak out from the fiber, possibly creating localized hot spots or catastrophic burns at high pump powers. DCOFs with the dual acrylate coating can pass the stringent reliability test specified by Telcodia GR-20 standard used in the telecom industry. Without doubt, DCOFs with the dual acrylate coating have a high tensile strength of greater than 700 kilo-pounds per square inch (kpsi) and an exceptional stress corrosion resistance. However, according to the GR-20 standard, after exposing DCOFs to an environment of 85° C. and 85% relative humidity (RH) for 720 hours, it shows an excess loss for laser output power due to possible degradation of the low refractive index coating in exposure to temperature and humidity. It is noted that the 85° C./85% condition not only affects the optical reliability of the low refractive index coating but also causes OH ingression into the glass core of the optical fiber, increasing attenuation of the glass core. For example, the attenuation in the typical pump wavelength range is well below a negligible 0.01 dB/m. After exposure the optical fiber to temperature and humidity, either wavelength-dependent or independent attenuation increases. The attenuation, in general, is associated with OH ingression in the silica, glass defects formed due to moisture ingression, and light scattered by the low refractive index polymer. That is, during the 85° C./85% RH test, moisture not only degrades the low-index polymer but also penetrates the glass cladding, resulting in the excess fiber loss.

In high-power laser delivery applications, a laser light or optical energy from a fiber laser is delivered to an application area using a transmission optical fiber or a delivery optical fiber. In the application area, the laser light must exit from an optical fiber end to free space. In order to maintain laser beam quality and prevent optical components upstream and downstream from damaging, a residual pump power, an amplified spontaneous emission (ASE) power, or an undesired signal power captured in the cladding of a DCOF in an optical fiber laser or an optical fiber amplifier needs to be removed. The residual pump power can be in hundreds of watts in kW fiber lasers, and the ASE can be in the range of several tens of watts, typically much higher in a fiber amplifier. A conventional way to remove the cladding light is to remove the low refractive-index fluoroacrylic coating for a length of the optical fiber and re-coat with a high refractive-index coating. Such an optical component is called cladding mode stripper. In this approach, a high numerical aperture (NA) cladding light will be more effectively stripped than a low-NA cladding light. However, this approach remains very useful because the low-NA pump light in the cladding is, in fact, more strongly absorbed in a fiber laser, leaving more of the high-NA light in the residual pump in the cladding. One real issue is that the act of cladding stripping is occurred over just several millimeters, creating a localized hot spot, which needs to be thermally managed to prevent the cladding mode stripper from damaging. Several different cladding mode strippers with longitudinal variations have been proposed to improve hot spot localization but to suffer from increased complexity.

Surfaces substantially perpendicular to a laser propagating direction are vulnerable to the high power-density laser light because any of surface imperfections such as impurity, defects, and contamination and Fresnel reflections due to a refractive index change when the laser light moves between two media can lower a damage threshold of the surfaces, easily burning down the surface. That is one of reasons that a fiber laser system is so popular over a solid-state laser nowadays because the possible number of surfaces is minimized by splicing all the optical fiber components in the system together, thus significantly increasing system's reliability. In many fiber laser applications, the laser light must exit from an optical fiber to free space. With a coreless piece of optical fiber, so called optical end cap, placed between the output end of the fiber laser and the free space, the risk of damage at the end face can be dramatically reduced. In this case, the beam expands along the coreless end cap, thereby reducing an optical power density at the end face and also back reflection due to the divergence in the beam.

As mentioned above, the optical end cap sustainable at high power is critical for highly reliable high-power fiber lasers. In the high-power fiber lasers, an integrated water-cooled package has been proposed, in which an optical end cap is completely immersed in the circulating water for efficient cooling. In this case, however, OH ingression in the silica and glass defects generated from moisture ingression can reduce the reliability of such an optical end cap. It is, therefore, the purpose of this patent application to disclose several water-cooled schemes in packaging an optical fiber head without immersing a delivery optical fiber in cooling water. The advantages include un-deteriorated attenuation and unstressed core and cladding of the delivery optical fiber, which shows long-term reliability and unaffected speckle patterns and beam quality when a high-power laser light is delivered to free space.

SUMMARY

A water-cooled package of an optical fiber head comprising a delivery optical fiber configured to transport a laser light, a front optical end cap, a rear optical end cap, a glass ferrule, and a housing. The front optical end cap comprises a first end face in a forward propagation direction of the laser light and a bore configured to accommodate the delivery optical fiber. The rear optical end cap comprises a second end face against the forward propagation direction of the laser light. The second end face is fusion-spiced with a section of the delivery optical fiber with a cladding exposed. The rear optical end cap is a coreless piece of optical fiber configured to expand a beam size of the laser light delivered by the section of the delivery optical fiber with the cladding exposed, thereby reducing power density not exceeding a damage threshold and to deliver the laser light from the delivery optical fiber to free space without accumulating heat created by the laser light forward propagated, backward propagated, or scattered and even burning out. The glass ferrule comprises a bore enclosing the section of the delivery optical fiber with the cladding exposed. The glass ferrule is connected and sealed between the front optical end cap and the rear optical end cap. The glass ferrule is configured to keep cooling water from immersing the section of the delivery optical fiber with the cladding exposed, thereby maintaining long-term reliability thereof.

The housing comprises an internally hollow space and an inner wall. The housing is configured to hold and fix the front optical end cap and the rear optical end cap in a way that a water-cooled cavity enclosed by the front optical end cap, the rear optical end cap, the glass ferrule, and the inner wall is formed with cooling water accommodated inside the water-cooled cavity, facilitating thermal dispersion. The housing is waterproof at each of interfaces between the front optical end cap and the glass ferrule, between the glass ferrule and the rear optical end cap, between the front optical end cap and the housing, and between the rear optical end cap and the housing such that the section of the delivery optical fiber is not immersed in the cooling water.

In one embodiment, the front optical end cap further comprises a first hole structure extruded cut to a predetermined depth from the first end face. The first hole structure is configured to accommodate the glass ferrule in a first end, wherein a first bonding agent fills gaps between the first hole structure and the glass ferrule to prevent the cooling water in the water-cooled cavity from leaking into the bore of the glass ferrule from the first end. Similarly, the rear optical end cap further comprises a second hole structure extruded cut to a predetermined depth from the second end face. The second hole structure is configured to accommodate the glass ferrule in a second end, wherein the first bonding agent fills gaps between the second hole structure and the glass ferrule to prevent the cooling water in the water-cooled cavity from leaking into the bore of the glass ferrule from the second end.

Each of the front optical end cap and the rear optical end cap protrudes the housing in a longitudinal direction in a way that a second bonding agent can easily be applied and wicked into gaps between the front optical end cap and the housing and between the rear optical end cap and the housing to fix thereof. The first bonding agent and the second bonding agent comprise a solder or an epoxy.

In another embodiment, the rear optical end cap further comprises a platform in a central area of the second end face, protruding toward the glass ferrule. The platform is configured to facilitate to fusion-splice the section of the delivery optical fiber with the cladding exposed on the platform. The platform has a diameter greater than a cladding diameter of the section of the delivery optical fiber with the cladding exposed to maximize optical energy received from the section of the delivery optical fiber with the cladding exposed.

In another embodiment, the rear optical end cap further comprises a conical surface of a right circular cone portion with an angle between the conical surface of the right circular cone portion and its optical axis greater than a divergence angle of the laser light propagating into the rear optical end cap to avoid optical loss and beam quality degradation due to optical clipping.

Each of the front optical end cap and rear optical end cap further comprises a cylindrical portion concentrically mated with the inner wall of the housing, wherein each cylindrical portion comprises a lateral surface coated with gold, substantially in contact with the inner wall of the housing. The housing is made of copper, wherein a solder is used to fill gaps between each of the lateral surface of the front optical end cap and rear optical end cap and the inner wall of the housing. In this case, the front optical end cap and rear optical end cap can be readily fixed by solder bonding, taking one of advantages that the solder has a inherently high melting temperature such as 180 degrees in Celsius relative to an epoxy, a glue, or an adhesive has a glass transition temperature (Tg) of 100 degrees in Celsius or so. Similarly, outer surfaces of the first end and the second end of the glass ferrule and inner surfaces of the first hole structure in the front optical end cap and the second hole structure in the rear optical end cap can be coated with the gold and sealed with the solder. In this case, the water-cooled package using the solder can survive in the temperature of 180 degrees in Celsius relative to 100 degrees in Celsius or so for the package using the epoxy.

In another embodiment, a portion of the glass ferrule is heat-treated in a way that a bore of the portion of the glass ferrule collapses to fuse with the section of the delivery optical fiber with the cladding exposed without an air interface, wherein the portion of the glass ferrule with the section of the delivery optical fiber with the cladding exposed is configured to strip cladding modes as a cladding mode stripper.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DETAILED DESCRIPTION OF VARIOUS EMBODIMENTS

Figure 1:
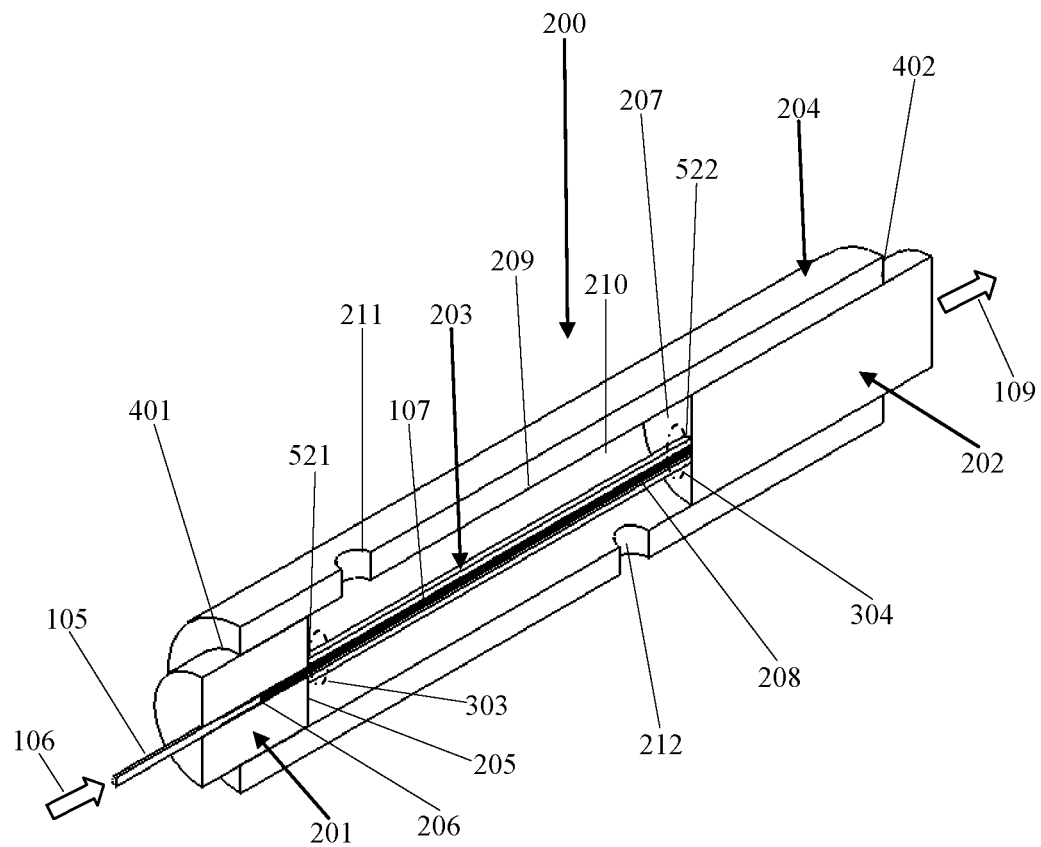
FIG. 1 is a cross-section view of a package of an optical fiber head in a first embodiment according to the present disclosure.

Reference will now be made in detail to the preferred embodiments of the disclosure. Wherever possible, same or similar reference numerals are used in the drawings and the description to refer to the same or like parts or steps. The drawings are in their simplest form and are not to scale.

Figure 2:
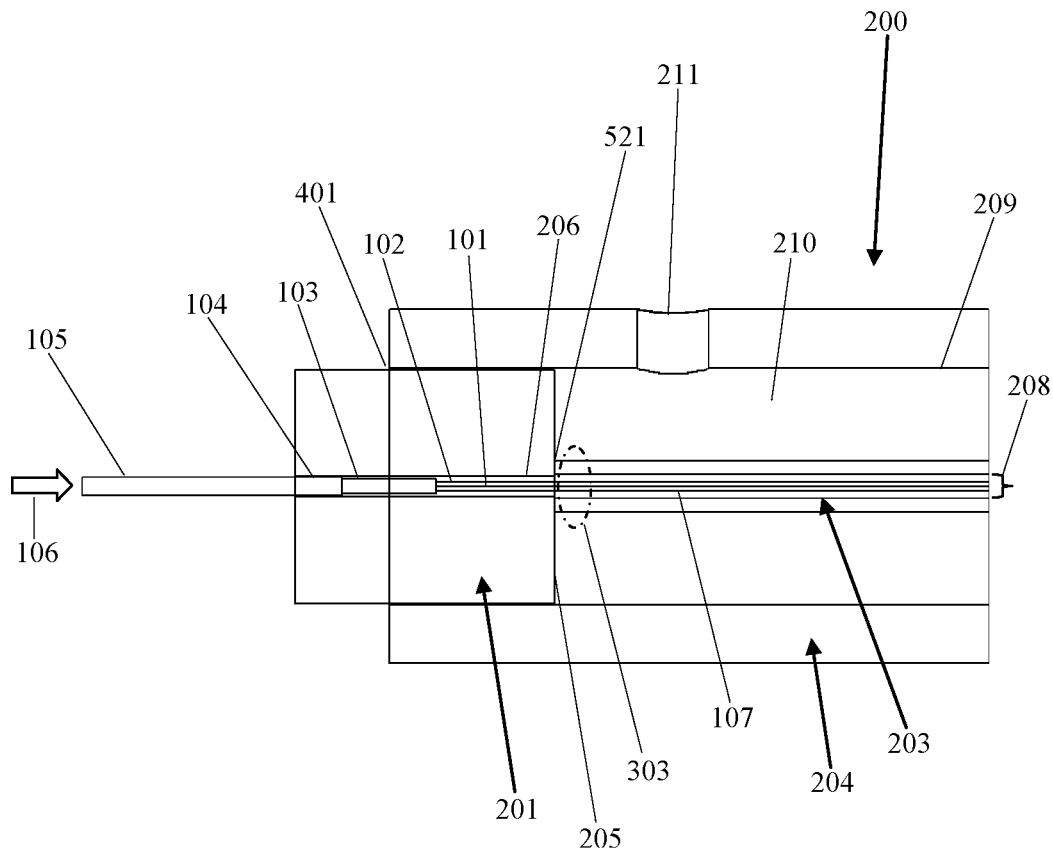
FIG. 2 is a partial enlargement of the cross-section view in FIG. 1 according to the present disclosure.

FIG. 1 is a cross-section view of a package of an optical fiber head in a first embodiment according to the present disclosure. A package of an optical fiber head 200 comprises a front optical end cap 201, a rear optical end cap 202, a glass ferrule 203, and a housing 204. The package of the optical fiber head 200 receives a high-power laser light 106 via a delivery optical fiber 105 and emits a laser light 109 to free space. FIG. 2 is a partial enlargement of the cross-section view in FIG. 1 according to the present disclosure. Referring to FIG. 1 and FIG. 2, the delivery optical fiber 105 comprises a glass core 101, a cladding 102, a buffer layer 103, and a jacket 104 with a section of delivery optical fiber 107 in which the buffer layer 103 and the jacket 104 are removed with the cladding 102 exposed. The section of delivery optical fiber 107 with the cladding 102 exposed (the section of delivery optical fiber 107 with the cladding exposed, hereinafter) is inserted into a bore 208 of the glass ferrule 203.

In FIG. 1, the front optical end cap 201 comprises a first end face 205 in a forward propagation direction of the high-power laser light 106 and a bore 206 configured to accommodate the delivery optical fiber 105. The rear optical end cap 202 comprises a second end face 207 against the forward propagation direction of the high-power laser light 106. The second end face 207 is fusion-spiced with the section of the delivery optical fiber 107 with the cladding exposed. The rear optical end cap 202 is a coreless piece of optical fiber configured to expand a beam size of the high-power laser light 106 delivered by the section of the delivery optical fiber 107 with the cladding exposed, thereby reducing power density not exceeding a damage threshold and to deliver the high-power laser light 106 from the delivery optical fiber 105 to free space without accumulating heat created by the high-power laser light 106 forward propagated, backward propagated, or scattered. The glass ferrule 203 comprises a first end 303, a second end 304, a bore 208 enclosing the section of the delivery optical fiber 107 with the cladding exposed. The glass ferrule 203 is connected and sealed between the front optical end cap 201 and the rear optical end cap 202 respectively at interfaces 521 and 522. The glass ferrule 203 is configured to keep the cooling water from immersing the section of the delivery optical fiber 107 with the cladding exposed, thereby maintaining long-term reliability of the section of the delivery optical fiber 107 with the cladding exposed. The housing 204 comprises an internally hollow space and an inner wall 209. The housing 204 is configured to hold and fix the front optical end cap 201 and the rear optical end cap 202 in a way that a water-cooled cavity 210 enclosed by the front optical end cap 201, the rear optical end cap 202, the glass ferrule 203, and the inner wall 209 is formed with the cooling water accommodated inside the water-cooled cavity 210, facilitating optical and thermal dispersion. The housing 204 further comprises a water inlet 211 and a water outlet 202 configured to circulate the cooling water and to remove heat from the front optical end cap 201, the rear optical end cap 201, and the glass ferrule 203, facilitating thermal dispersion. The housing 204 is waterproof at each of interfaces between the front optical end cap 201 and the glass ferrule 203 at the interface 521, between the glass ferrule 203 and the rear optical end cap 202 at the interface 522, between the front optical end cap 201 and the housing 204, and between the rear optical end cap 202 and the housing 204 such that the section of the delivery optical fiber 107 with the cladding exposed is not immersed in the cooling water. In FIG. 1, the section of the delivery optical fiber 107 with the cladding exposed may pass the bore 206 of the front optical end cap 201 without bonding, in which a varying stress-induced phenomenon such as fiber speckle patterns can be largely reduced, potentially improving beam quality of the high-power laser light 106 exiting the rear optical end cap 202.

Figure 3:
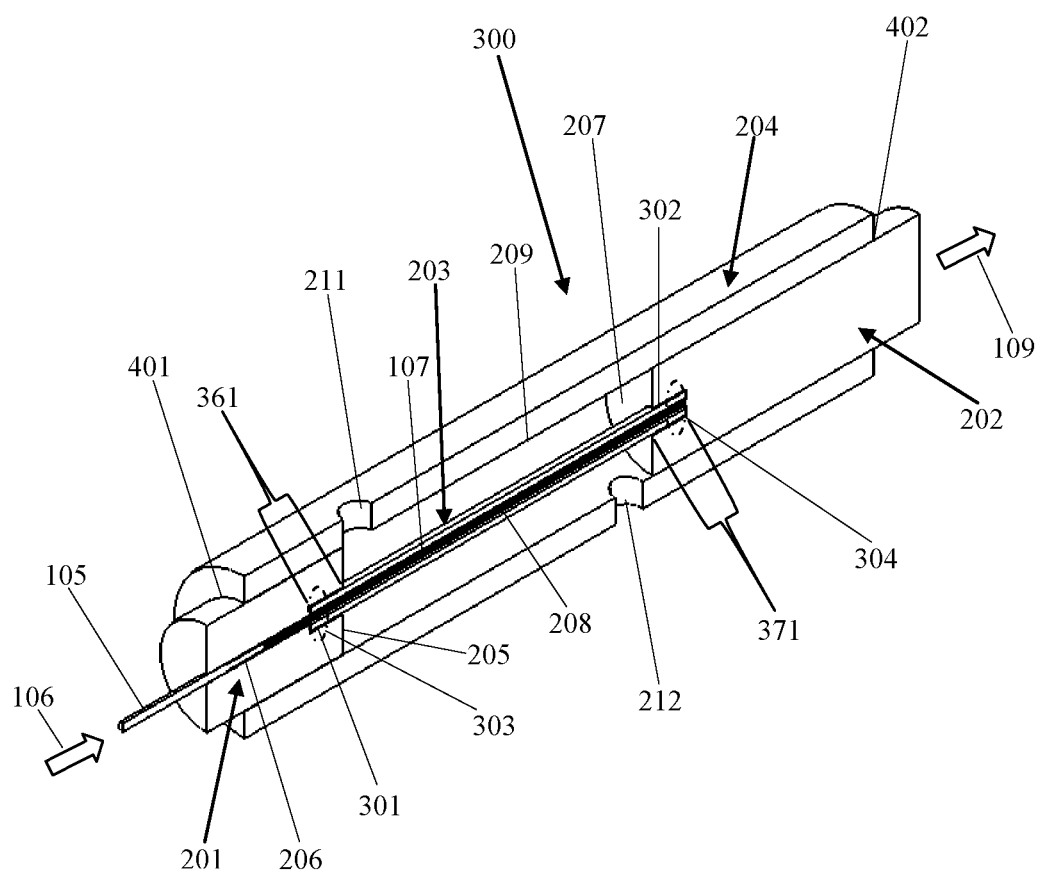
FIG. 3 is a cross-section view of a package of an optical fiber head in a second embodiment according to the present disclosure.

FIG. 3 is a cross-section view of a package of an optical fiber head in a second embodiment according to the present disclosure. In FIG. 3, a package of an optical fiber head 300 comprises all the elements in the package of an optical fiber head 200 as depicted in FIG. 1, except that the front optical end cap 201 and the rear optical end cap 202, each further respectively comprises a first hole structure 301 and a second hole structure 302. The first hole structure 301 is extruded cut to a predetermined depth 361 from the first end face 205. The first hole structure 301 is configured to accommodate the glass ferrule 203 in the first end 303 of the glass ferrule 203, wherein a first bonding agent fills gaps between the first hole structure 301 and the glass ferrule 203 to prevent the cooling water in the water-cooled cavity 210 from leaking into the bore 208 of the glass ferrule 203 from the first end 303 of the glass ferrule 203.

Similarly, the second hole structure 302 is extruded cut to a predetermined depth 371 from the second end face 207 of the rear optical end cap 202. The second hole structure 302 is configured to accommodate the glass ferrule 203 in the second end 304 of the glass ferrule 203, wherein the first bonding agent fills gaps between the second hole structure 302 and the glass ferrule 203 to prevent the cooling water in the water-cooled cavity 210 from leaking into the bore 208 of the glass ferrule 203 from the second end 304 of the glass ferrule 203.

In FIGS. 1 and 3, each of the front optical end cap 201 and the rear optical end cap 202 protrudes the housing 204 in a way that a second bonding agent can easily be applied at edges 401 and 402 and wicked into gaps between the front optical end cap 201 and the housing 204 and between the rear optical end cap 202 and the housing 204 to fix thereof. The first bonding agent and the second bonding agent comprise a solder or an epoxy.

Figure 4:
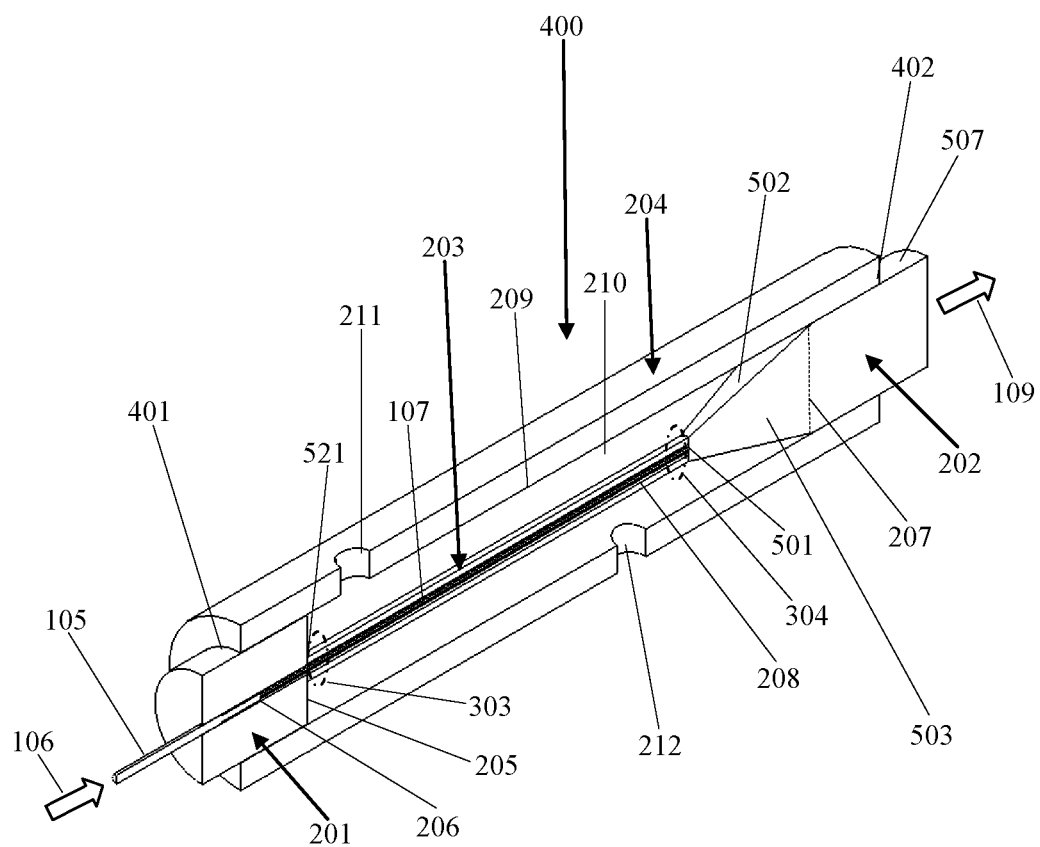
FIG. 4 is a cross-section view of a package of an optical fiber head in a third embodiment according to the present disclosure.
Figure 5:
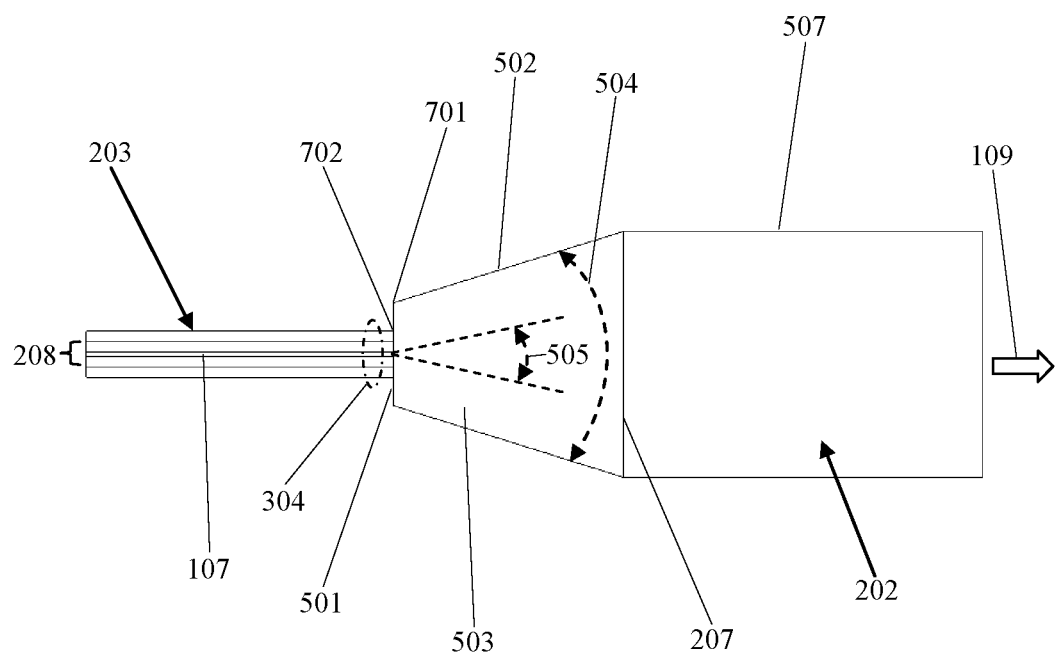
FIG. 5 is a partial enlargement of the cross-section view in FIG. 4 according to the present disclosure.

FIG. 4 is a cross-section view of a package of an optical fiber head in a third embodiment according to the present disclosure. FIG. 5 is a partial enlargement of the cross-section view in FIG. 4 according to the present disclosure. Referring to FIGS. 4-5, a package of an optical fiber head 400 comprises all the elements in the package of an optical fiber head 200 as depicted in FIG. 1, except that the rear optical end cap 202 further comprises a platform 501 in a central area of the second end face 207 and a conical surface 502. The platform 501 protrudes toward the glass ferrule 203. The platform 501 is configured to facilitate to fusion-splice the section of the delivery optical fiber 107 with the cladding exposed on a central position of the platform 501. The platform 501 has a diameter 701 greater than a diameter 702 of the glass ferrule 203 to accommodate an end face of the glass ferrule 203 in the second end 304 of the glass ferrule 203 and to maximize optical energy received from the section of the delivery optical fiber 107 with the cladding exposed.

In FIGS. 4-5, the conical surface 502 is a surface in a right circular cone portion 503 extruded-bossed from the second end face 207 of the rear optical end cap 202. The conical surface 502 has a conical angle 504 greater than a divergence angle 505 of the high-power laser light 106 exiting the delivery optical fiber 107 with the cladding exposed and propagating into the right circular cone portion 503 and the rear optical end cap 202 to avoid both optical loss and beam quality degradation due to optical clipping. When the high-power laser light 106 exiting from the section of the delivery optical fiber 107 with the cladding exposed launches into the rear optical end cap 202, a laser beam from the high-power laser light 106 is expanded without core guiding along the rear optical end cap 202 with a divergence angle determined by a diffraction-limited condition, thus reducing an optical power density on the platform 501. In this case, the conical angle 504 of the conical surface 502 in the right circular cone portion 503 must be greater than the divergence angle 505 of the laser beam launching into the right circular cone portion 503 and the rear optical end cap 202 to ensure no optical clipping occurred.

Figure 6:
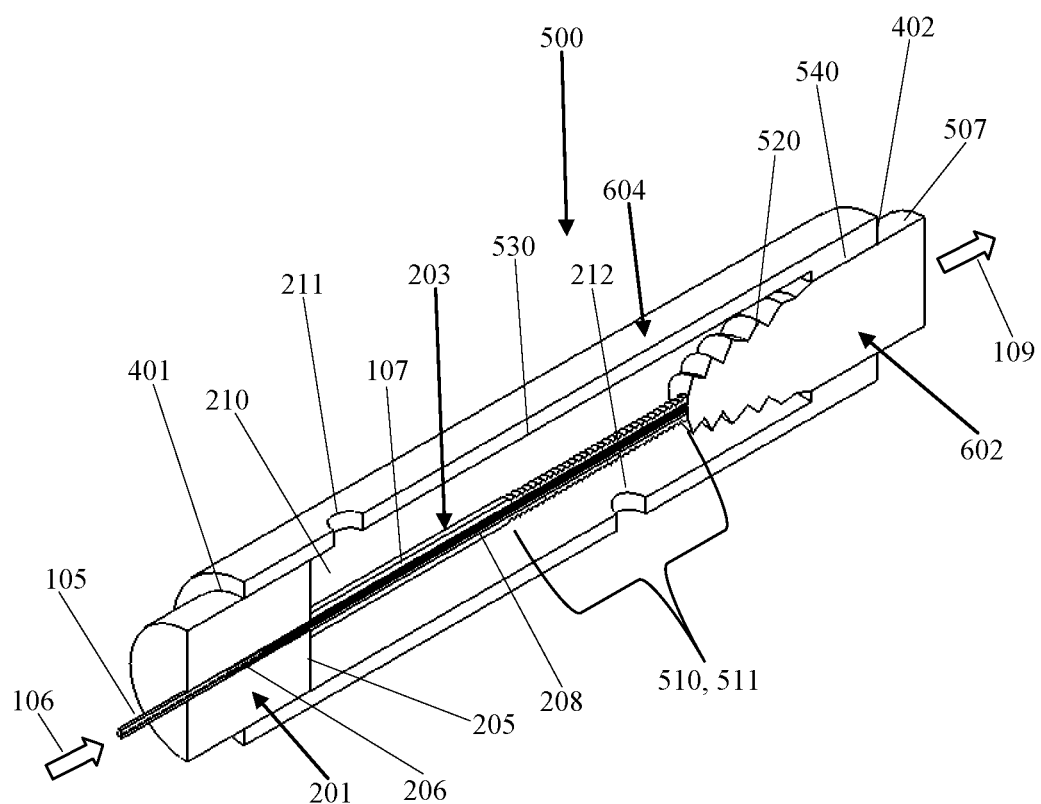
FIG. 6 is a cross-section view of a package of an optical fiber head in a fourth embodiment according to the present disclosure.

FIG. 6 is a cross-section view of a package of an optical fiber head in a fourth embodiment according to the present disclosure. In FIG. 6, a package of an optical fiber head 500 comprises all the elements in the package of an optical fiber head 400 as depicted in FIG. 4, except that the glass ferrule 203 comprises a heat-treated portion 510, that the conical surface 502 (in FIG. 4) comprises a corrugated structure 520, that a rear optical end cap 602 comprises a lateral surface 507 of a cylindrical portion with a smaller diameter than those in the rear optical end cap 202 depicted in FIGS. 1-4, and that a housing 604 comprises a counterbore structure. By using oxyhydrogen flame or other high-temperature heating means to increase surface temperature of the heat treated portion 510 until the bore 208 of the glass ferrule 203 collapses, the glass ferrule 203 will fuse together with the section of delivery optical fiber 107 with the cladding exposed inside the bore 208 of the glass ferrule 203. In this case, no air interface will be formed between the section of delivery optical fiber 107 with the cladding exposed and a collapsed bore of the glass ferrule 203 in the heat-treated portion 510. Because a refractive index of the glass ferrule 203 is higher than that of the cladding, residual pump light in the cladding of the section of delivery optical fiber 107 with the cladding exposed is stripped off. This is different from prior art that a glass capillary is bonded to the envelope surface of the cladding using an adhesive or a cementing material, such as a glass epoxy with a proper refractive index. Experiments show that after a long-term exposure to high power laser radiation, the adhesive or the cementing material used is deteriorated, resulting in either a reduced bonding strength or a changed refractive index, eventually burning out the section of delivery optical fiber 107 with the cladding exposed inside the bore 208 of the glass ferrule 203. In FIG. 5, the heat-treated portion 510 comprises a roughened structure on its lateral surface, configured to disperse optical and thermal dispersion. In an optical sense, the roughened structure helps deflect and diffuse the cladding mode light stripped by the glass ferrule 203. In a thermal sense, the roughened structure helps disperse heat accumulated in the glass ferrule. Therefore, the heat-treated portion 510 of the glass ferrule 203 may be used to strip cladding modes as a cladding mode stripper 511.

In FIG. 6, the corrugated structure 520 on the conical surface 502 (FIG. 4) can effectively deflect, scatter, and disperse the stripped cladding light. When the high-power laser light 106 is forward propagating from the cladding mode stripper 511, the stripped cladding light shines the rear optical end cap 602. A reflected laser light backward propagating from reflected surfaces outside the rear optical end cap 602 also shines the rear optical end cap 602. Thus, the corrugated structure 520 works to deflect, scatter, and disperse not only the forward-propagating stripped cladding light but also the reflected laser light so as not to feedback to the section of the delivery optical fiber 107 with the cladding exposed, creating burning problems. In addition, the corrugated structure 520 can help disperse heat from accumulating in the rear optical end cap 202.

In FIG. 6, the counterbore structure comprises a large diameter bore 530 and a small diameter bore 540. The small diameter bore 540 is used to accommodate the rear optical end cap 602 and hence concentrically mated with the lateral surface 507 of the cylindrical portion in the rear optical end cap 602.

In FIGS. 1-6, each of the front optical end cap 201 and rear optical end cap 202, in fact, respectively comprises a cylindrical portion concentrically mated with the inner wall 209 of the housing 204 in FIGS. 1-4 or the large diameter bore 530 and the small diameter bore 540 in FIG. 6, wherein each of the cylindrical portion comprises a lateral surface, coated with gold, substantially in contact with the inner wall 209 of the housing 204 in FIGS. 1-4 or the large diameter bore 530 and the small diameter bore 540 in FIG. 6. The lateral surfaces, if coated with gold, may be fixed in the housing 204 in FIGS. 1-4 or the housing 604 in FIG. 6, which are made of copper, using a solder to fill gaps and to ensure a long-term operation without failure.

In FIG. 6, when the high-power laser light 106 from a fiber laser or a fiber amplifier reaching kWs or tens of kWs is delivered, an optical energy leakage from both forward and backward propagating core-guided light to the adjacent cladding at air-quartz interfaces becomes powerful enough. Once in the cladding, the optical energy leakage induces thermal loads on a polymeric coating surrounding the cladding. If not completely stripped, the optical energy leakage may create localized hot spots and, in the worst cast, damage the section of the delivery optical fiber 107 with the cladding exposed, the cladding mode stripper 510, or the rear optical end cap 202 or 602 (in FIG. 6) when a damage temperature is reached. When the high-power laser light 106 is incident, the cladding mode stripper 511 removes residual pump energy from the cladding light, and the roughened structure on the heat-treated portion 510 of the glass ferrule 203 scatters the stripped pump energy in the water-cooled cavity 210. On the other hand, the reflected laser light from any surfaces in free space, including a workpiece, is launched into the rear optical end cap 602, further refracted to enter the water-cooled cavity 210. In FIGS. 1-6, all of such undesired optical energy, forward and backward, is further scattered by the corrugated structure 520 (FIG. 6) or reflected, refracted, and scattered by the front optical end cap 201, the rear optical end cap 202, and the glass ferrule 203 (FIG. 1-5), eventually entering the cooling water and being absorbed by the cooling water. The overall heat is removed to keep a uniform temperature around the front optical end cap 201, the rear optical end cap 202 (FIGS. 1-3), the rear optical end cap 202 connected with the right circular cone portion 503 (FIG. 4), and the rear optical end cap 602 (FIG. 6), the glass ferrule 203, and the housing 204 (or 604 in FIG. 6), avoiding any localized hot spots.

Whereas preferred embodiments of the present disclosure have been shown and described, it will be realized that alterations, modifications, and improvements may be made thereto without departing from the scope of the following claims. Another package of an optical fiber head assembly with a water-cooled or heat-sinking means using various kinds of combinations to accomplish the same or different objectives could be easily adapted for use from the present disclosure. Accordingly, the foregoing descriptions and attached drawings are by way of example only, and are not intended to be limiting.

What is claimed is:

1. A water-cooled package of an optical fiber head, comprising:
    a delivery optical fiber configured to transport a laser light;
    a front optical end cap comprising a bore and a first end face in a forward propagation direction of the laser light, the bore configured to accommodate the delivery optical fiber;
    a rear optical end cap comprising a second end face against the forward propagation direction of the laser light, wherein the second end face is fusion-spiced with a section of the delivery optical fiber with a cladding exposed, and wherein the rear optical end cap is configured to expand a beam size of the laser light exiting from the section of the delivery optical fiber with the cladding exposed, thereby reducing power density not exceeding a damage threshold in delivering the laser light from the delivery optical fiber to free space without accumulating heat created by the laser light forward propagated, backward propagated, or scattered;
    a glass ferrule comprising a first end, a second end, and a bore enclosing the section of the delivery optical fiber with the cladding exposed, wherein the glass ferrule is connected and sealed between the front optical end cap and the rear optical end cap, and wherein the glass ferrule is configured to keep cooling water from immersing the section of the delivery optical fiber with the cladding exposed, thereby maintaining long-term reliability thereof; and
    a housing comprising an internally hollow space and an inner wall, the housing configured to hold and fix the front optical end cap and the rear optical end cap and to accommodate the cooling water to facilitate thermal dispersion, wherein a water-cooled cavity is formed by an enclosure of the front optical end cap, the rear optical end cap, the glass ferrule, and the inner wall,
    wherein the housing is waterproof at each of interfaces between the front optical end cap and the glass ferrule, between the glass ferrule and the rear optical end cap, between the front optical end cap and the housing, and between the rear optical end cap and the housing.

2. The water-cooled package of claim 1, wherein the front optical end cap further comprises a first hole structure extruded cut to a predetermined depth from the first end face, wherein the first hole structure is configured to accommodate the glass ferrule, and wherein a first bonding agent fills gaps between the first hole structure and the glass ferrule to prevent the cooling water in the water-cooled cavity from leaking into the bore of the glass ferrule in the first end of the glass ferrule.

3. The water-cooled package of claim 2, wherein the first bonding agent comprises a solder or an epoxy.

4. The water-cooled package of claim 1, wherein the rear optical end cap further comprises a second hole structure extruded cut to a predetermined depth from the second end face, wherein the second hole structure is configured to accommodate the glass ferrule, and wherein the first bonding agent fills gaps between the second hole structure and the glass ferrule to prevent the cooling water in the water-cooled cavity from leaking into the bore of the glass ferrule in the second end of the glass ferrule.

5. The water-cooled package of claim 4, wherein the first bonding agent comprises a solder or an epoxy.

6. The water-cooled package of claim 1, wherein each of the front optical end cap and the rear optical end cap protrudes the housing so that respective interface edges are formed and wherein a second bonding agent can easily be applied and wicked from the respective interface edges into gaps between the front optical end cap and the housing and between the rear optical end cap and the housing to fix thereof.

7. The water-cooled package of claim 6, wherein the second bonding agent comprises a solder or an epoxy.

8. The water-cooled package of claim 1, wherein the rear optical end cap further comprises a platform in a central area of the second end face, protruding toward the glass ferrule, the platform configured to facilitate to fusion-splice the section of the delivery optical fiber with the cladding exposed on the platform.

9. The water-cooled package of claim 8, wherein the platform has a diameter greater than a diameter of the glass ferrule to accommodate the glass ferrule.

10. The water-cooled package of claim 1, wherein the rear optical end cap further comprises a conical surface of a right circular cone portion with a conical angle greater than a divergence angle of the laser light propagating into the rear optical end cap to avoid optical loss and beam quality degradation due to optical clipping.

11. The water-cooled package of claim 1, wherein each of the front optical end cap and the rear optical end cap further comprises a lateral surface of a cylindrical portion concentrically mated with the inner wall of the housing.

12. The water-cooled package of claim 11, wherein each lateral surface of the cylindrical portion comprises a coating of gold, substantially in contact with the inner wall of the housing.

13. The water-cooled package of claim 12, wherein the housing is made of copper and wherein a solder is used to fill gaps between the lateral surface and the inner wall of the housing and to fix the front optical end cap and the rear optical end cap in the housing.

14. The water-cooled package of claim 1, the glass ferrule further comprises a heat-treated portion, in which the bore of the glass ferrule collapses to fuse with the section of the delivery optical fiber with the cladding exposed inside the bore of the glass ferrule without an air interface, and wherein the heat-treated portion is configured to strip cladding modes as a cladding mode stripper.

15. The water-cooled package of claim 14, wherein the heat-treated portion comprises a roughened surface configured to deflect, diffuse, scatter, and disperse a cladding mode light stripped by the cladding mode stripper.

16. The water-cooled package of claim 1, wherein the housing further comprises a water inlet and a water outlet configured to circulate the cooling water and to remove heat from the front optical end cap, the rear optical end cap, and the glass ferrule, facilitating thermal dispersion.

* * * * *